United States Patent
Wang et al.

(10) Patent No.: US 10,057,168 B2
(45) Date of Patent: *Aug. 21, 2018

(54) RECEIVE SIDE SCALING FOR OVERLAY FLOW DISPATCHING

(71) Applicant: Nicira, Inc., Palo Alto, CA (US)

(72) Inventors: Yong Wang, Sunnyvale, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 14/929,329

(22) Filed: Oct. 31, 2015

(65) Prior Publication Data

US 2017/0126567 A1  May 4, 2017

(51) Int. Cl.
| | |
|---|---|
| *H04L 12/28* | (2006.01) |
| *H04L 12/743* | (2013.01) |
| *H04L 12/823* | (2013.01) |
| *H04L 29/12* | (2006.01) |

(52) U.S. Cl.
CPC .......... *H04L 45/7453* (2013.01); *H04L 47/32* (2013.01); *H04L 61/2592* (2013.01)

(58) Field of Classification Search
CPC ................................................. H04L 45/7453
USPC ...................................................... 370/392
See application file for complete search history.

(56) References Cited

U.S. PATENT DOCUMENTS

| | | | |
|---|---|---|---|
| 2008/0181245 A1 | 7/2008 | Basso et al. | |
| 2012/0230335 A1* | 9/2012 | Filsfils | H04L 45/7453 370/392 |
| 2014/0153393 A1 | 6/2014 | Janakiraman et al. | |
| 2014/0321469 A1* | 10/2014 | Goel | G06F 9/505 370/392 |
| 2015/0326475 A1* | 11/2015 | Cj | H04L 61/103 370/392 |
| 2015/0341473 A1* | 11/2015 | Dumitrescu | H04L 69/22 370/392 |
| 2016/0057070 A1* | 2/2016 | Saxena | H04L 47/365 370/392 |
| 2017/0126565 A1 | 5/2017 | Wang et al. | |
| 2017/0126566 A1 | 5/2017 | Wang et al. | |

* cited by examiner

*Primary Examiner* — Christopher R Crompton
(74) *Attorney, Agent, or Firm* — Adeli LLP

(57) ABSTRACT

A packet forwarding element that includes a hardware dispatch unit and a multi-core processor with a plurality of processing cores. The hardware dispatch unit receives packets from a plurality of networks including physical and logical networks. Packets received from the logical networks include overlay network encapsulation. The dispatch unit identifies, when a packet does not include overlay network encapsulation, a plurality of header fields of the packet that uniquely identify the particular packet flow. The dispatch unit identifies, when a packet includes overlay network encapsulation, the plurality of header fields of the packet that uniquely identify the packet flow in an inner set of header fields of the packet that are encapsulated in the overlay network encapsulation. The dispatch unit calculates a hash value of the identified plurality of the header fields and dispatches the packet to a core of the plurality of cores based on the calculated hash value.

20 Claims, 13 Drawing Sheets

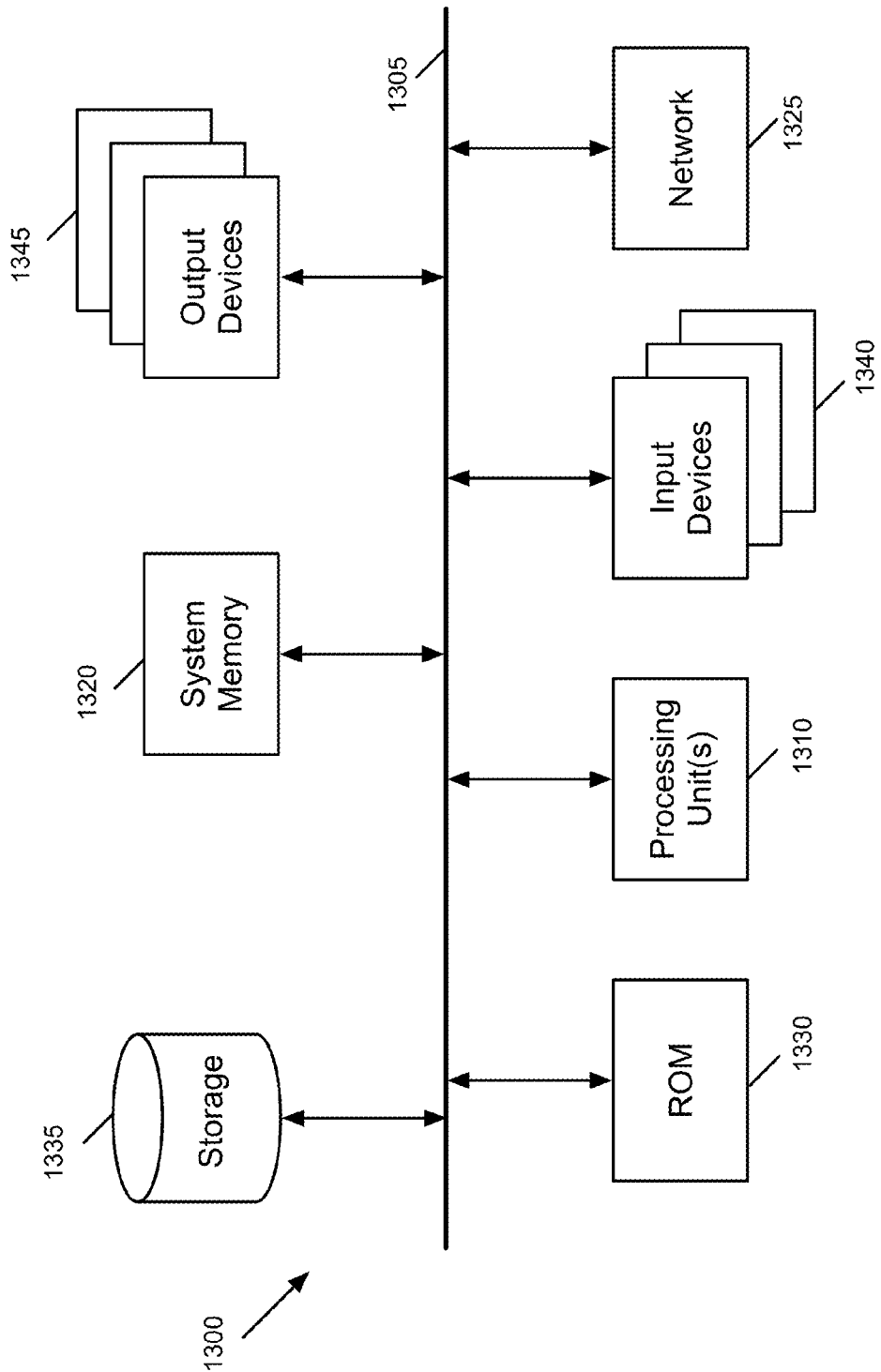

RECEIVE SIDE SCALING FOR OVERLAY FLOW DISPATCHING

BACKGROUND

Overlay networks are used to enable network virtualization built on top of existing physical networks. An overlay network is a network virtualization technology that achieves multi-tenancy in a computing environment. An overlay network stretches a Layer 2 (L2) network across Layer 3 (L3) boundaries of the physical infrastructure by decoupling the physical topology from the logical topology. The decoupling provides flexibility and mobility allowing compute nodes to be dynamically placed anywhere in a data center, removing the traditional L2 boundaries of the physical infrastructure.

Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over L3 network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

Many packet processing frameworks utilize processors with multiple cores and operate on the assumption that a flow (identified by the 5-tuple of IP source, IP destination, Layer 4 (L4) source, L4 destination, and protocol identification) will arrive on the same processing core to avoid the cost of locking and synchronization that is needed to correctly process the packets of the same flow. To dispatch a flow, hardware receive side scaling (RSS) is used. The RSS hashes a packet based on the 5-tuple and then uses the hash to select a core for receive processing to provide maximum parallelism. All modern network interface cards (NICs) can perform RSS by identifying the 5-tuple from a packet that does not have overlay network encapsulation and do proper hashing.

The overlay mechanism, however, adds additional encapsulation layers over a packet. Many NICs do not consider the overlay network encapsulation when hashing the packets received from an overlay network. The packets of a flow that are received from the overlay network and have overlay network encapsulation may therefore land on a different core than the packets of the same flow received from a portion of the network such as VLAN that does not perform overlay encapsulation.

BRIEF SUMMARY

Some embodiments utilize software re-dispatching after a packet has been dispatched by a hardware NIC. These embodiments determine whether or not a packet is an encapsulated overlay packet that is received from a logical network. Packets that are received from a physical network without overlay encapsulation are hashed by the hardware and assigned to a processor core. For instance, the hardware hashes a set of headers fields (such as a n-tuple) to come up with a hash value and uses the hash value to select one of the processor cores to process the packet.

If the hardware is not aware of overlay network encapsulation, the packets that are received from an overlay network are hashed based on a different n-tuple from the outer header (i.e., the overlay network header that encapsulates the packets). Depending on the hashing algorithm, the hardware may send packets of a flow that are received from an overlay network to a different core than the packets of the same flow that are received from a network that does not use overlay encapsulation.

In some embodiments, packets that are received from an overlay network are rehashed and re-dispatched by software. The same hashing algorithm and the same inner header tuple that is used by hardware is utilized by software to calculate a hash value and use the hash value to select a processor core to process the packet. The packet is then placed back in the input queue of the selected core.

Since the software uses the same hashing algorithm that is used by hardware and applies the hash algorithm on the same header fields of each packet, packets of the same flow are always dispatched to the same core regardless of whether the packet direction is from physical network (with no overlay encapsulation) to logical network (with overlay encapsulation) or vice versa. This technique requires that the software use the same hash algorithm that is used by hardware, which requires the knowledge of the hash algorithm used by hardware. In addition, if the hardware changes the hashing algorithm used to dispatch the packets to different cores, the re-dispatching software has to be updated accordingly. Furthermore, to support different hardware that might use different hash implementations, the software needs to detect and implement all possible hash algorithms. This technique, however, provides the advantage that only the packets that are received from the overlay network are re-dispatched.

In alternative embodiments, packets are re-hashed and re-dispatched regardless of whether or not the packets are received from an overlay network. In these embodiments, a hashing algorithm that is selected by software is applied to a pre-determined set of fields in each packet and rehashing based on the same hash algorithm is performed on every received packet. Regardless of the first hashing algorithm that is used by hardware to send a packet to one of the processor cores, the set of fields in the packet is re-hashed using the second hashing algorithm that is utilized by software. The packet is then re-dispatched to the core that is selected by the software hashing algorithm. This approach requires one more re-dispatching compared to the approach that only re-dispatches the packets received from the overlay networks. This technique, therefore incurs the additional cost associated with packet re-queuing, cache warn up, etc. The advantage of this approach is that there is no need to know the exact hash algorithm used by hardware.

In yet other alternative embodiments, the hardware is modified to be aware of overlay network encapsulation. These embodiments, instead of using a third party or off-the-shelf hardware dispatch unit (or NIC interface), utilize a custom-made hardware dispatch unit that is aware of overlay network encapsulation. In these embodiments, the hardware determines that a packet is received from an overlay network, selects the same n-tuple from the inner layers of the packet as the n-tuple that is used for the packets that are not overlay encapsulated. The hardware dispatch unit then hashes the n-tuple to calculate a hash value. Since the same n-tuple and the same algorithm is used by hardware dispatch unit for packets that are received from overlay networks and packets that are received from other networks, the packets of the same flow are dispatched by the hardware to the same processor core.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 13 conceptually illustrates an electronic system with which some embodiments of the invention are implemented.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Figure 1:
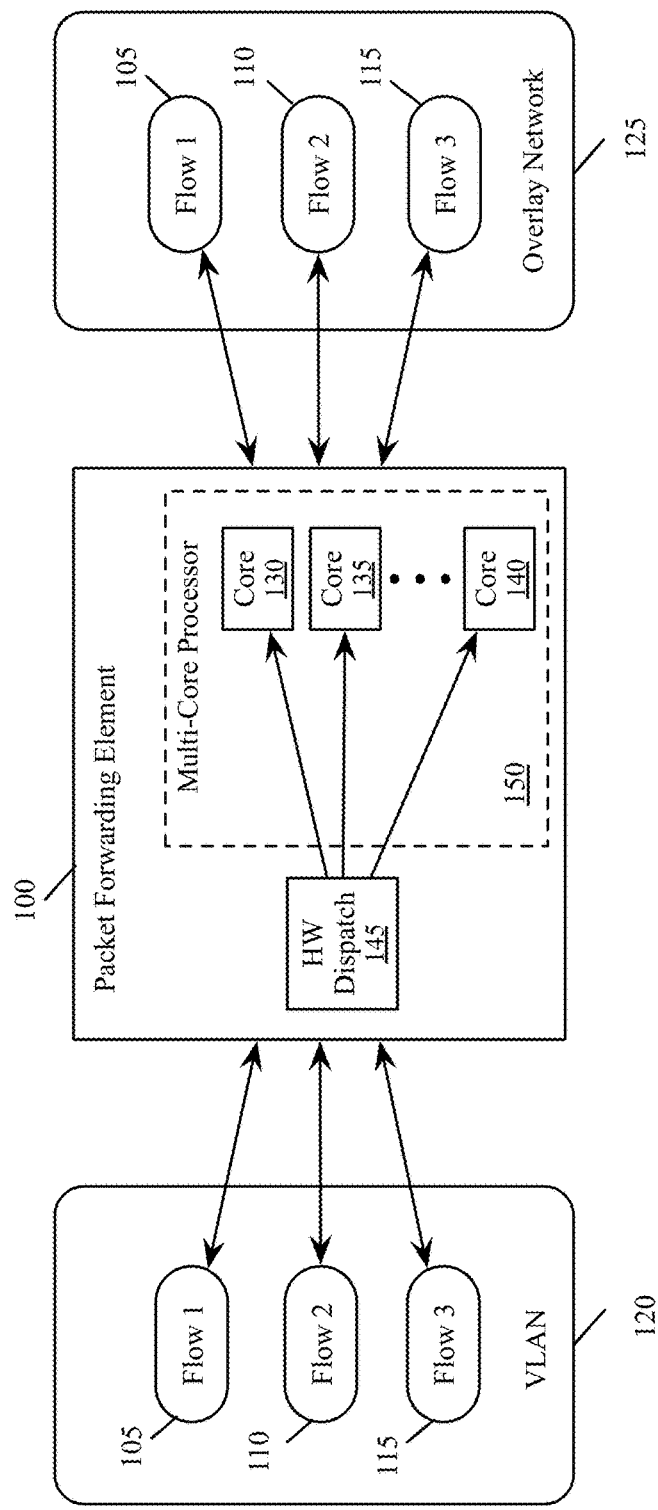
FIG. 1 conceptually illustrates a packet forwarding element in some embodiments.

FIG. 1 conceptually illustrates a packet forwarding element 100 in some embodiments. A packet forwarding element in some embodiments is a managed forwarding element running on a computing device that runs virtualization software for hosting virtual machines. Virtualization software (e.g., a hypervisor, virtual machine monitor, etc.) is a software abstraction layer that operates on top of the hardware and below any operating system. In other embodiments, the packet forwarding element is a "bare metal" computing device that does not run any virtualization software.

An example of such a packet forwarding element is a gateway at the edge (or entry point) of a network. A gateway is a network point that acts as an entrance to another network. In a network provided by a datacenter, a computing resource assigned to be a gateway node facilitates and regulates traffic between the datacenter network and an external physical network. The gateway is typically associated with a router, which knows where to direct a given packet of data that arrives at the gateway. The gateway is also typically associated a switch, which furnishes the actual path in and out of the gateway for a given packet. The gateway is also a compute node that provides various network traffic services, such as firewall, network address translation (NAT), security protocols (such as HTTP over SSL), etc. The forwarding element 100 receives packets for several flows (or sessions) 105-115 from different networks such as virtual local area network (VLAN) 120 and overlay network 125. The forwarding element processes the packets (e.g., provides firewall, performs NAT, checking security protocols, and other services) and forwards the packets to their destinations (not shown).

As shown, the packet forwarding element 100 includes a multi-core processor 150 and a hardware dispatch unit 145. The multi-core processor includes several cores 130-140. The multi-core processor 150 is a single chip that includes multiple execution cores (or computational engines) 130-140. Each core 130-140 appears to the operating system as a separate processing unit. The cores can run different processes at the same time. The hardware dispatch unit 145 in the illustrated embodiment in not a component of the multi-core processor. In alternative embodiments, the hardware dispatch unit is a component of the multi-core processor. In some embodiments, each core comprises a receiving (or input) queue to receive packets at the core.

The hardware dispatch unit comprises logic, electronic circuitry, interfaces and/or code that are operable to receive packets that arrive at the packet forwarding element from different networks and dispatch the packets to the cores of the multi-core processor. The hardware dispatch unit in some embodiments is a NIC interface that supports multiple receive and transmit queues. The NIC interface sends different packets to different queues in order to distribute processing among the cores. The NIC interface distributes incoming packets by applying a filter to each packet to assign the packets to one of the queues. The filter used is typically a hash function over the network layer (L3) and/or transport layer headers (L4). For example, the hash function can be applied to a 4-tuple including IP addresses and TCP ports of a packet. As another example, the hash function can be applied to a 5-tuple that includes the L3 source and destination addresses, the L4 source and destination ports, and the L4 protocol used. The hardware dispatch unit uses an algorithm such as Toeplitz to perform hashing calculation.

The multi-core processor in some embodiments is implemented on a single integrated circuit (IC) chip. Each core in some embodiments includes level one cache (also referred to as L1 cache) that is only available and utilized by the particular core. The multi-core processor also includes level two cache (also referred to as L2 cache) that is available to all cores in the multi-core processor chip. An example of a multi-core processor is an Intel® multi-core processor. Some embodiments utilize Data Plane Development Kit (DPDK), which provides a programming framework for multi-core processors and enables faster development of high-speed data packet networking applications. DPDK Provides a set of data plane libraries and network interface controller drivers for fast packet processing.

Figure 2A:
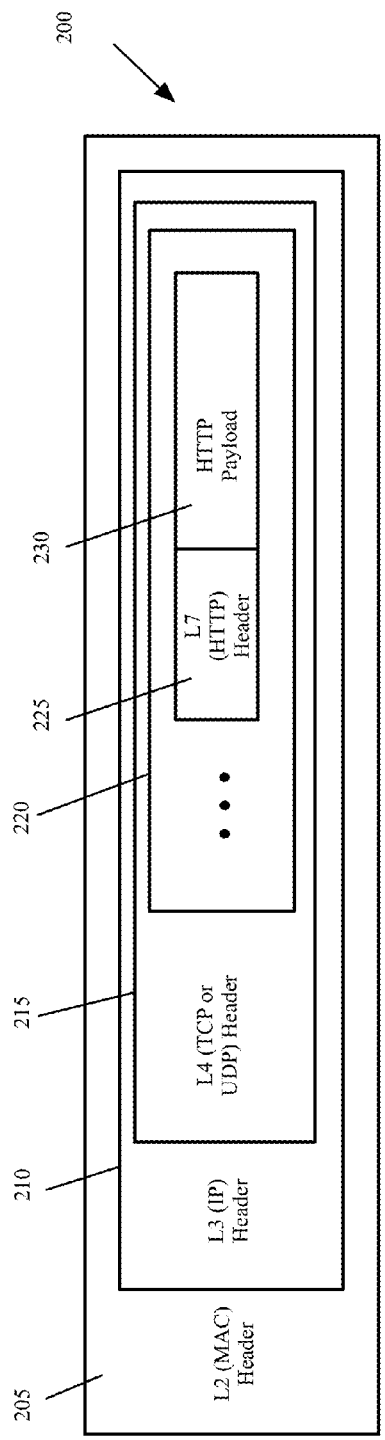
FIG. 2A conceptually illustrates a simplified diagram of a packet of a physical network in some embodiments.

Network 120 is a physical network such as a VLAN. FIG. 2A conceptually illustrates a simplified diagram of a packet of the physical network 120 in some embodiments. The Example of FIG. 2A shows a packet 200 that is generated according to Open Systems Interconnection (OSI) model. As shown, the packet includes data for multiple abstraction layers. The OSI Layer 2 (or data link layer) header 205 in this example includes media access control (MAC) addresses of the source and the next hop destination for the packet. Layer 2 encapsulates Layer 3 (or network layer) 210, which in this example uses Internet protocol (IP). Layer 3 encapsulates Layer 4 (or transport layer) 215, which in this example uses either the transmission control protocol (TCP) or user datagram protocol (UDP).

Other layers of the packet include data 220 that relates to other OSI layers and protocols such as secure sockets layer (SSL), structured query language (SQL), hypertext markup language (HTML), etc. In this example, the innermost layer includes Layer 7 (or application layer) that includes hypertext transfer protocol (HTTP) header 225 and the HTTP payload 230.

Figure 2B:
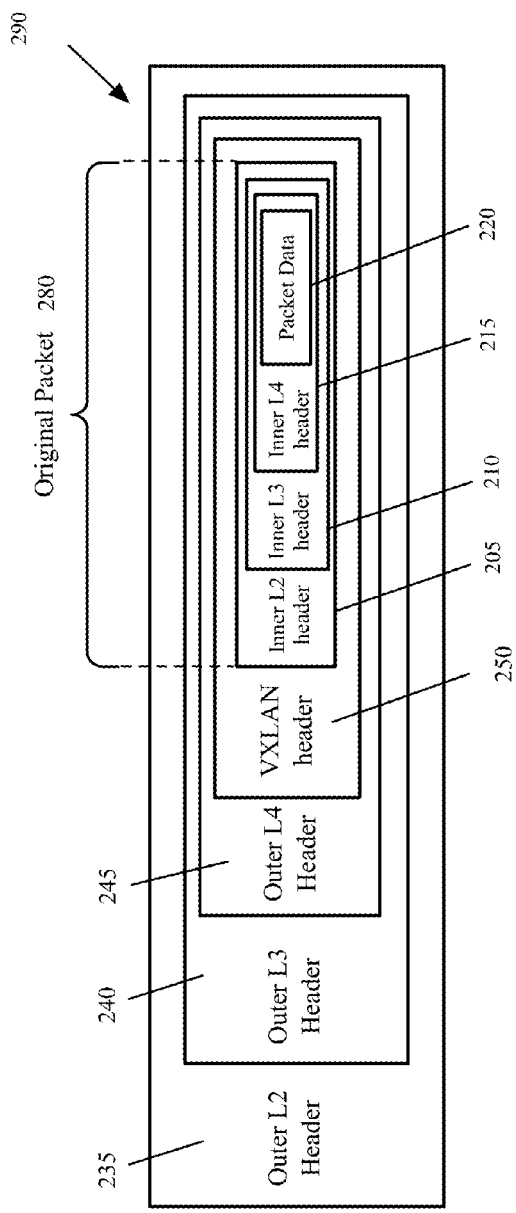
FIG. 2B conceptually illustrates a simplified diagram of a packet that is received at the forwarding element from an overlay network.

FIG. 2B conceptually illustrates a simplified diagram of a packet that is received at the forwarding element 100 from an overlay network such as overlay network 125. The Example of FIG. 2B shows a packet 290 with VXLAN encapsulation. As shown, the original packet (e.g., an original Ethernet frame, referred to herein as the inner packet or the inner frame) 280 that includes user data is encapsulated in a set of overlay headers 235-250 in order to transport the packet across L3 boundaries of the network. The overlay network encapsulation is typically disregarded when the packet is received at the final destination. The overlay headers that encapsulate the inner packet 280 include a VXLAN header 250. This inner packet is further wrapped in an L4 header 245 (referred to as outer L4 header to distinguish it from the inner L4 header 215). The result is further wrapped in an L3 header 240 (referred to as outer L3 header to distinguish it from the inner L3 header 210). The result is further wrapped in an L2 header 235 (referred to as outer L2 header to distinguish it from the inner L2 header 205). Other details of packets 200 and 290 are not shown for simplicity.

The hardware dispatch unit 145 in FIG. 1 uses a set of header fields of each packet to calculate a hash value. The hash value is then used to dispatch the packet to one of the cores 130-140 for processing. Each flow 105-115 is uniquely identified by a set of header fields referred to as an n-tuple. For instance, each flow can be identified by a 5-tuple that includes the L3 source and destination addresses (e.g., IP source and IP destination addresses), the L4 source and destination ports (e.g., TCP or UDP source and destination ports), and the L4 protocol used (e.g., TCP or UDP).

Figure 3:
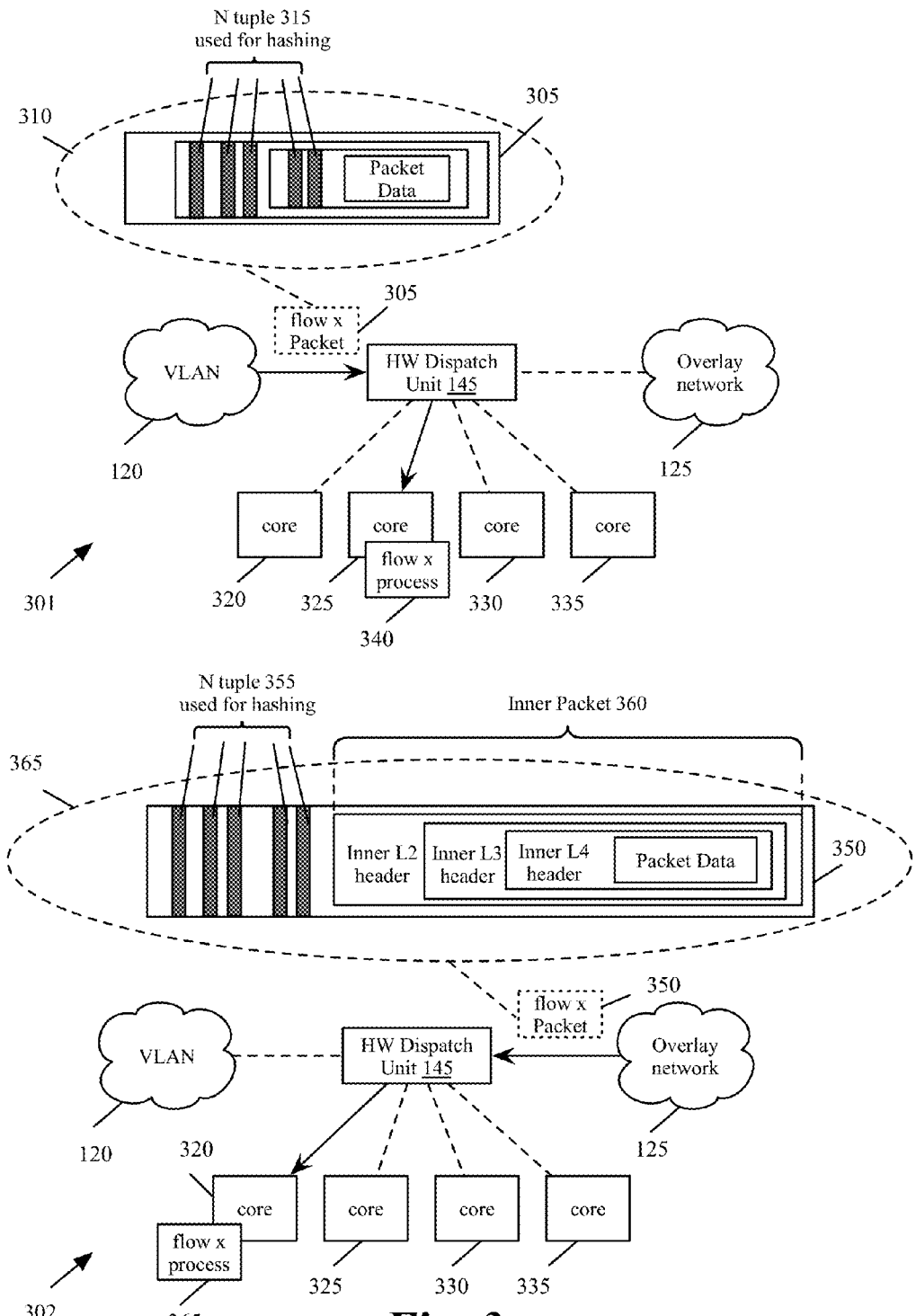
FIG. 3 illustrates packet dispatching done by a hardware dispatch unit according to prior art.

FIG. 3 illustrates packet dispatching done by a hardware dispatch unit 305 according to prior art. The figure shows packet dispatching in two steps 301 and 302. As shown, in step 301 a packet 305 that belongs to a particular flow (e.g., flow x) is received at the hardware dispatch unit 145 from the VLAN 120. As shown in the expanded view 310, the packet 305 has a similar structure as packet 200 in FIG. 2A.

The hardware dispatch unit 145 hashes an n-tuple 315 from the packet to calculate a hash value (not shown). Each of the header fields included in the n-tuple is identified, e.g., by using an offset from the beginning of the packet 305. The calculated hash value is used to identify one of the cores 320-335 to dispatch the packet. For instance, the low order bits of the hash value are masked out and a set of higher bits of the hash value is used to select one of the cores. For example, if there are 2 to the power of n cores, an n bit value can be used to select one of the cores. Alternatively, the hash value modulo n can used to come up with a number between 0 to n−1 to identify one of the n cores. In this example, there are 4 cores and the hash value modulo 4 has resulted in a value of 1, which results in the packet to be dispatched to core 325. Since the n-tuple of all packets of flow x have the same set of values, all packets of flow x that are received from VLAN 120 are dispatched to and processed by (as shown by 340) core 325.

In step 302, a packet 350 for the same flow (flow x) is received at the hardware dispatch unit 145 from the overlay network 125. As shown in the expanded view 365, packet 350 (which is an overlay network packet) has a different structure than packet 305. The structure of packet 350 is similar to packet 290 in FIG. 2B. Since the hardware dispatch unit 145 is not aware of overlay network packet format, it uses the same criteria (e.g., the same offsets from the beginning of the packet 350) to select the n-tuple 355 to perform hash value calculation.

Since the n-tuple 315 that was selected for packet 305 is located inside the inner packet 360 of overlay network packet 350, the selected n-tuple 355 for packet 350 is different that the selected n-tuple 315 of packet 305. In the example of FIG. 3, the hash value of the n-tuple 355 results in a different hash value than the hash value of n-tuple 315.

As shown, packet 350 is dispatched to and processed by (as shown by 365) core 320. As a result, the two packets 305 and 350 that belong to the same flow are processed by different cores. Since several common data structures (such as e.g., connection tracking tables) are used to process packets of the same flow, these data structures have to be locked by each core during processing of each packet. Locking of data structures results in processing delays and creates inefficiencies.

Several embodiments are described in the sections below that dispatch packets of the same flows to the same cores. Using the same core to process packets of the same flow avoids placing locks by different cores on data structures that are used to process the same flow's packets. Section I describes re-dispatching of packets that are received from overlay networks by the core software by using the same hashing algorithm that is used by the hardware dispatch unit. Section II describes re-dispatching of packets that are received from all networks by using a common software hashing algorithm. Next, Section III describes a hardware dispatch unit that is aware of overlay networks and selects the same n-tuple to hash from packets that are received from physical and logical networks. Finally, Section IV describes an electronic system that implements some embodiments of the invention.

I. Re-Dispatching Packets Received from Overlay Networks by Software Using the Same Hashing Algorithm Utilized by Hardware Some embodiments utilize software executed on cores of a multi-core processor to re-dispatch overlay encapsulated packets of each flow to the core that is processing the packets of the same flow that were not overlay encapsulated. These embodiments identify the same n-tuple in the overlay encapsulated packets as the n-tuples of the packets that are not overlay encapsulated and utilize the same hash algorithm that the hardware dispatch unit uses, in order to re-dispatch the packets received from the overlay networks.

Figure 4:
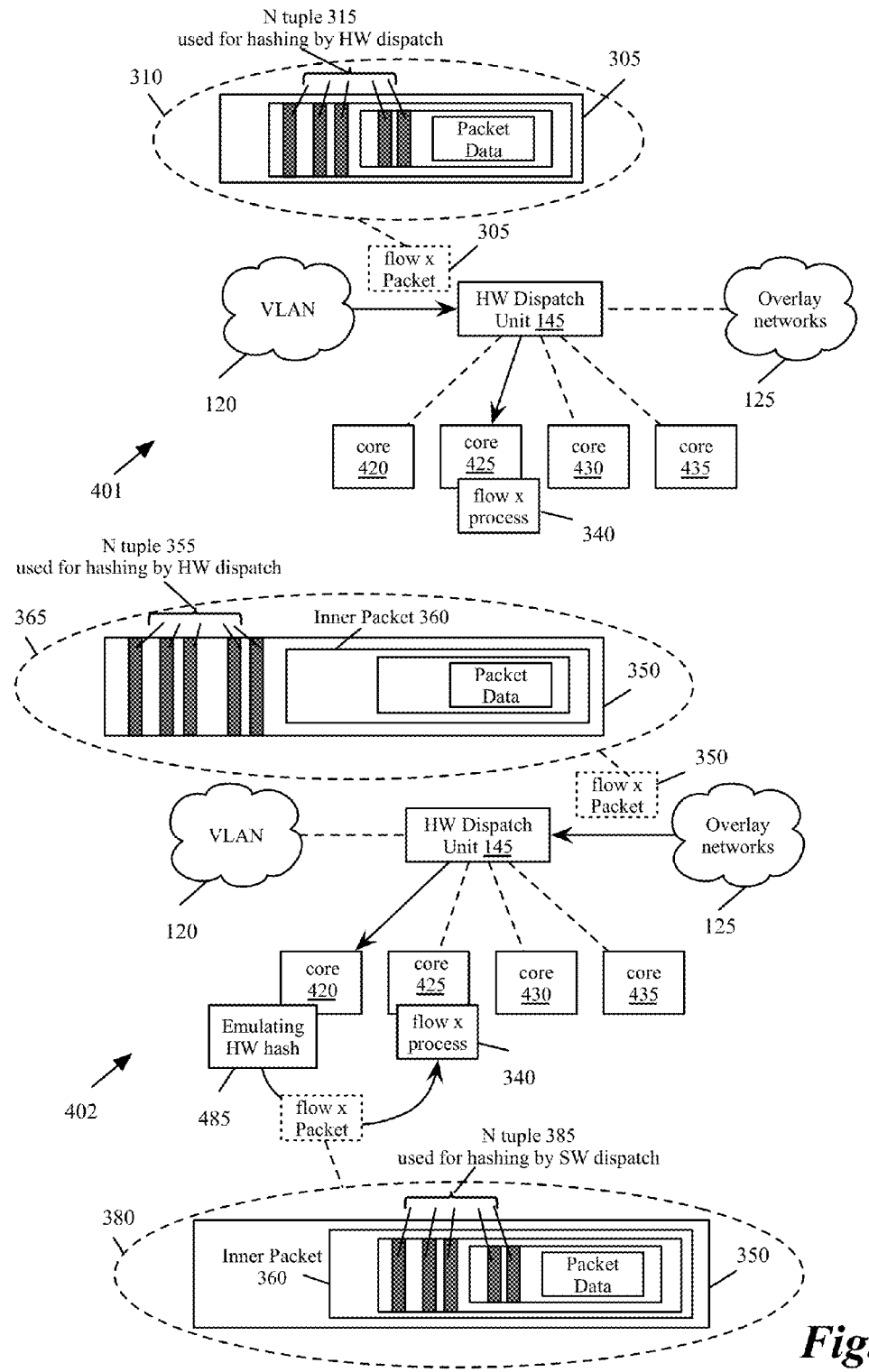
FIG. 4 conceptually illustrates re-dispatching of the packets received from the overlay networks in some embodiments.

FIG. 4 conceptually illustrates re-dispatching of the packets received from the overlay networks in some embodiments. The figure is shown in two steps 401 and 402. Step 401 is similar to step 301 in FIG. 3. As shown, a packet 305 for flow x is received from a network 120 (in this example a VLAN) that does not use overlay encapsulation. The hardware dispatch unit 145 uses an n-tuple 315 in the packet's header to calculate a hash value. For instance, the n-tuple may include the L3 source and destination addresses (e.g., IP source and IP destination addresses), the L4 source and destination ports (e.g., TCP or UDP source and destination ports), and the L4 protocol used (e.g., TCP or UDP). The hash value is used to select a core such as core 425. The packet is dispatched to and processed by core 425.

In step 402, a packet 350 is received from an overlay network such as overlay network 125. As shown in the expanded view 365, the inner packet 360 is encapsulated by overlay network's outer layer headers (as described by reference to FIG. 2B). Similar to step 301 in FIG. 3, the hardware dispatch unit is not aware of overlay network packet structure and uses the same criteria to select an n-tuple 355 as was used to select the n-tuple 315 of packet 305 (which was not overlay encapsulated). As a result, the selected n-tuple 355 is different than n-tuple 315 and results in a different hash value. This hash value is used by the hardware dispatch unit 145 to dispatch packet 350 to a different core (in this example, core 420) despite the fact that both packets 305 and 350 belong to the same flow.

In step 402, however, core 420 does not process packet 350. Instead, a re-dispatch process performed by software on core 420 determines that packet 350 is overlay encapsulated. The process identifies (as shown in the expanded view 380) the inner n-tuple 385 of packet 350 that matches the n-tuple 315 of packet 305.

The re-dispatch process then calculates a hash value for the n-tuple 385 by using the same hash algorithm (as shown by 485) that is used by the hardware dispatch unit. The calculated hash value would be the same as the hash value calculated in step 401 (since n-tuples 315 and 385 belong to the same flow and have identical values). The hash value is then used to re-dispatch packet 350 to core 425, which is the same core that processes packets of the same flow that were not overlay encapsulated.

It should be noted that many hashing algorithms used today by hardware are order-sensitive. This means that if a packet's tuples of L4 source port, L4 destination port, L3 source address, and L3 destination address are reversed (such as an HTTP RESPONSE to an HTTP GET), the hash results will be different. In the embodiments that emulate order-sensitive hardware hashing, the software specifically reverses the order of the tuples in order to get the identical hash result. For algorithms that are order-insensitive, the order of the tuples is not an issue.

In order for the mechanism shown in FIG. 4 to work properly, the hashing algorithm used by the hardware dispatch unit has to be known and cores 420-435 have to be programmed to use the same hash algorithm to re-dispatch the overlay encapsulated packets. It should be understood that the hashing performed by cores 420-435 to re-dispatch packets does not need to be step by step the same as the hash algorithm used by the hardware dispatch unit. It suffices that the two hash algorithms always generate the same results when applied to the same set of values. For instance, the hardware dispatch unit may use certain operations that are performed faster by hardware. The operation can be performed using different steps in software as long as the end results generated by both algorithms are the same.

The software hashing algorithm may use a simplified version of these operations that are more fit to perform by software as long as the two hashing algorithms always generate the same results. In addition, once the hash algorithm used by hardware dispatch unit is changed or updated, the hash algorithm used by core software has to be changed or updated accordingly. Furthermore, to support different hardware that might use different hash implementations, the software needs to detect and implement all possible hash algorithms. The hardware dispatch unit in some embodiments utilizes receive side scaling (RSS), which is a network driver technology that is used to distribute network receive processing across multiple processors (such as the cores of a multi-core processor). In some embodiments the hardware dispatch unit utilizes a hash algorithm such as Toeplitz hash algorithm to perform RSS.

Figure 5:
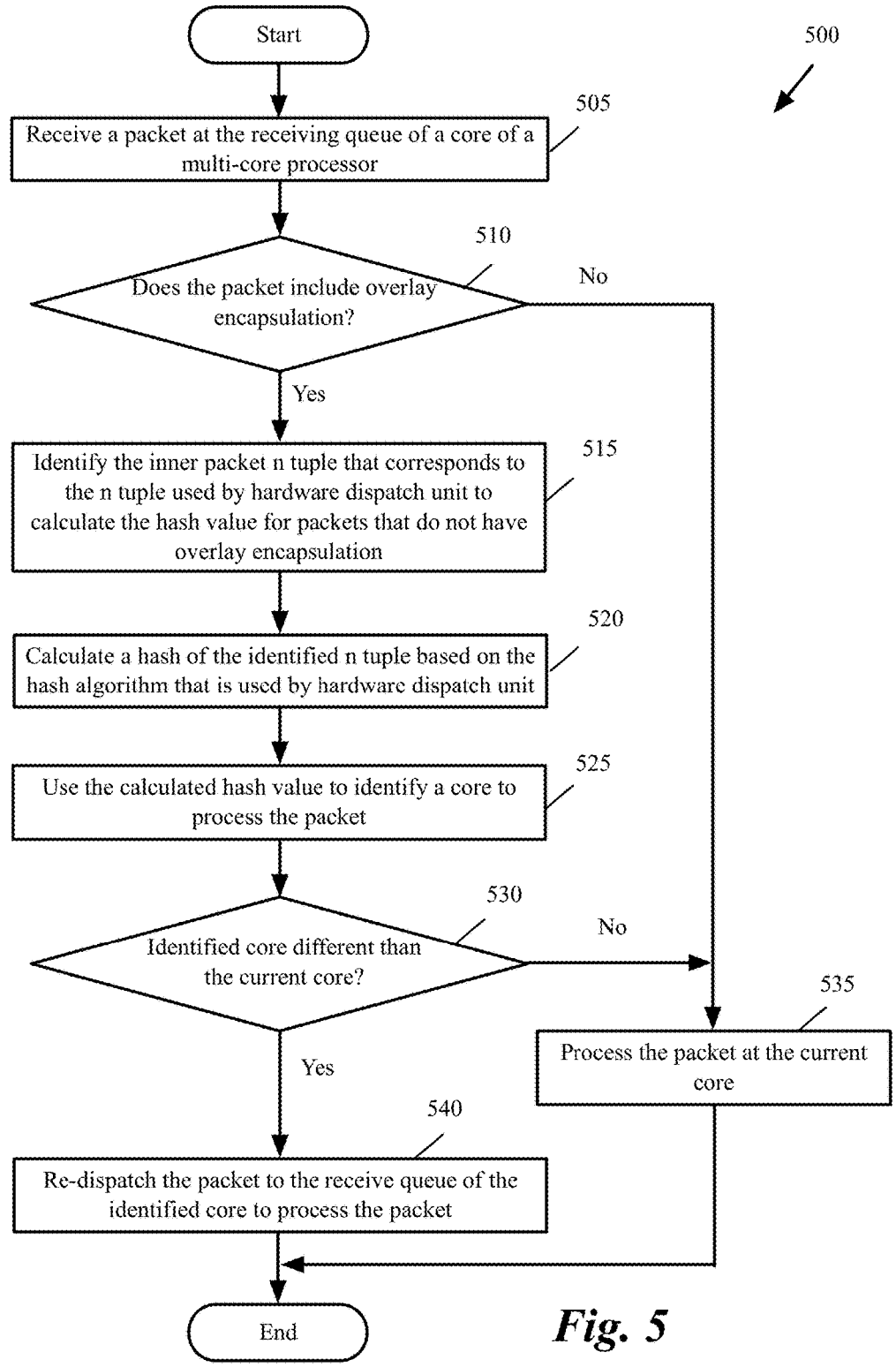
FIG. 5 conceptually illustrates a process in some embodiments for performing re-dispatching of the packets that are received from the overlay networks.

FIG. 5 conceptually illustrates a process 500 in some embodiments for performing re-dispatching of the packets that are received from the overlay networks. Process 500 is performed by a processing unit (or a core) of a multi-core processor in some embodiments. As shown, the process receives (at 505) a packet at the receiving queue of a core of a multi-core processor. For instance, the process receives packet 305 or 350 at core 425 or 420 as shown in FIG. 4.

The process then determines (at 510) whether the packet includes overlay encapsulation. The process in some embodiments examines one or more header fields that indicate the packet is overlay encapsulated. For instance, a packet that includes VXLAN overlay encapsulation may specify a particular UDP port as the destination port in the outer L4 header. The particular UDP port in the outer L4 destination port, therefore, may specify that the packet includes overlay encapsulation as well as the type of overlay encapsulation (e.g., VXLAN) used. Alternatively, the process may determine the packet is overlay encapsulated when the process determines that the packet is received from a particular overlay network. For instance, the process determines that the packet is received from a logical network that uses a specific type of overlay encapsulation (e.g., VXLAN encapsulation).

When the packet is not overlay encapsulated, the process performs (at 535) packet processing at the current core (i.e., the core that has received the packet in its receiving queue). Examples of processing performed by process 400 on a packet include performing connection tracking, providing firewall services, performing NAT, checking security protocols, etc. The process then either forwards the packet to the next destination identified in the packet headers or drops the packet based on different criteria used to forward a packet to its next destination. The process then ends.

When the process determines that the packet includes overlay encapsulation, the process identifies (at 515) the inner packet n-tuple that corresponds to the n-tuple that is used by hardware dispatch unit to calculate the hash value to dispatch the packet to a core. For instance, the process identifies n-tuple 385 in packet 350 that corresponds to the n-tuple 315 in packet 315. In other words, the process bypasses the overlay encapsulation layers to access the inner packet 360 and applies the same criteria (e.g., using the same offsets or the same fields) to the inner packet 360 fields to identify n-tuple 385 as the criteria that are applied to packet 305 (which does not have overlay encapsulation) to identify n-tuple 315.

Next, the process calculates (at 520) a hash of the identified n-tuple based on the hash algorithm used by the hardware dispatch unit. The process then uses the hash value to identify (at 525) a core (such as core 420 in FIG. 4) to process the packet. For instance, the process masks out the low order bits of the hash value and uses a set of higher bits of the hash value to select one of the cores, as described above. Alternatively, the process calculates a modulo of the hash value based on the number of the available cores to identify a core to dispatch the packet.

The process then determines (at 530) whether the identified core is different than the current core. Although the process uses a different n-tuple (such as n-tuple 385) to calculate the hash value than the n-tuple (such as n-tuple 355) used by hardware dispatch unit, there is always a chance that the calculating the hash values and taking a set of bits from the hash value by the hardware dispatch unit and the core software result in identifying the same core.

When the core identified in operation 525 is the same as the current core, the process proceeds to 535, which was described above. Otherwise, the process re-dispatches the packet to the receive queue of the core identified by software hashing in order for the identified core to process the packet. For instance, the packet is re-dispatched from core 420 to core 425 as shown in FIG. 4. The process then ends.

In some embodiments, a core that re-dispatches a packet to another core strips the overlay encapsulation layers of the packet prior to re-dispatching the packet to the other core in order to prevent the other core from repeating process 500 on the packet. In other embodiments, a core that re-dispatches a packet to another core sends a signal (e.g., by setting or resetting a flag or semaphore in a pre-determined location in L2 cache that is accessible by all cores) to signal the other core not to repeat process 500 on the packet.

Figure 6:
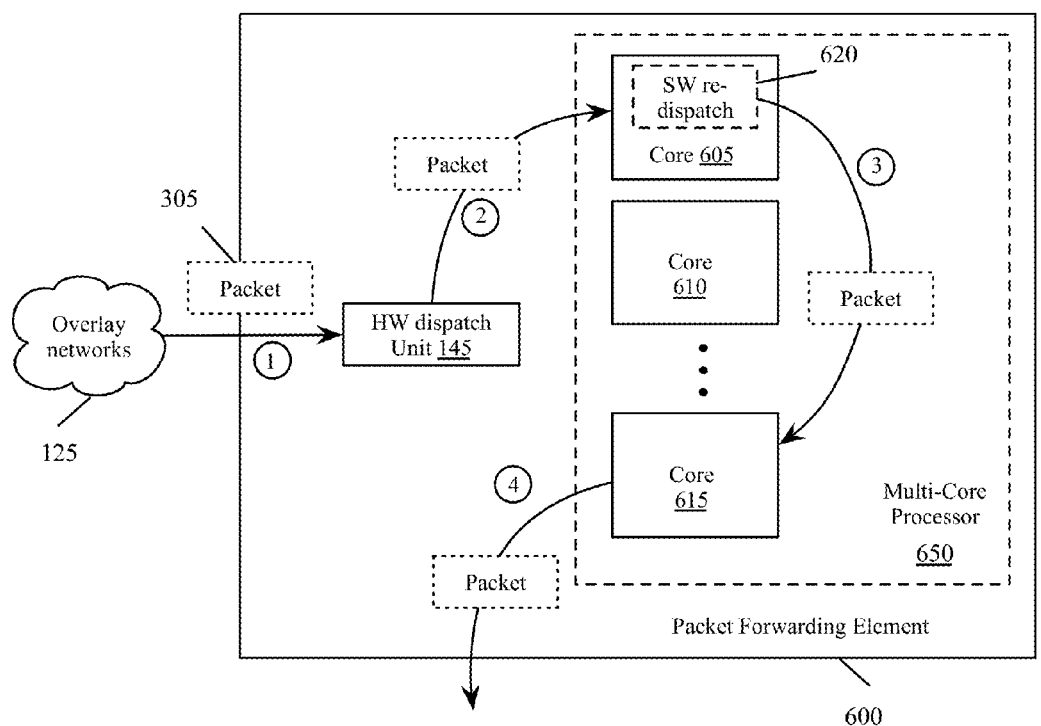
FIG. 6 conceptually illustrates the path of a packet that is received from an overlay network inside a forwarding element in some embodiments.

FIG. 6 conceptually illustrates the path of a packet that is received from an overlay network (such as packet 350 in FIG. 4) inside a forwarding element 600 in some embodiments. The packet forwarding element 600 includes a hardware dispatch unit 145 and a multi-core processor 650 that includes several cores 605-615. The hardware dispatch unit in some embodiments is a NIC interface that supports multiple receive and transmit queues.

As shown in step 1, the packet 350 is received by the hardware dispatch unit 415 from a logical network such overlay network 125. The hardware dispatch unit then calculates the hash of an n-tuple in the packet and dispatches the packet (as shown in step 2) to a core 605 that is identified based on the calculated hash value.

In step 3, the software in core 605 determines that the packet includes overlay encapsulation and calculates a new hash to re-dispatch the packet (e.g., as described above by reference to process 500). Core 605 then uses the hash calculated by software (as shown by 620) based on an n-tuple of the inner packet to identify another core 615 to re-dispatch the packet. The packet is then re-dispatched from core 605 to core 615. Core 615 processes the packet and forwards the packet to the next destination outside the forwarding element 600 as shown in step 4. Since all packets of the same flow are processed by the same core, there is no need to lock common data structures that are used to process different packets of the same flow.

II. Re-Dispatching Packets Received from all Networks Using a Software Hashing Algorithm Some embodiments utilize software to re-dispatch every packet that is dispatched by a hardware dispatch unit to different cores such that all packets of the same flow are re-dispatched to the same core. These embodiments use a hash algorithm that may be different than the hash algorithm used by the hardware dispatch unit. Since the software applies the hash algorithm on every packet regardless of whether or not the packets are arrived from overlay networks, there is no need to use (or to have a knowledge of) the hash algorithm used by the hardware dispatch unit.

Figure 7:
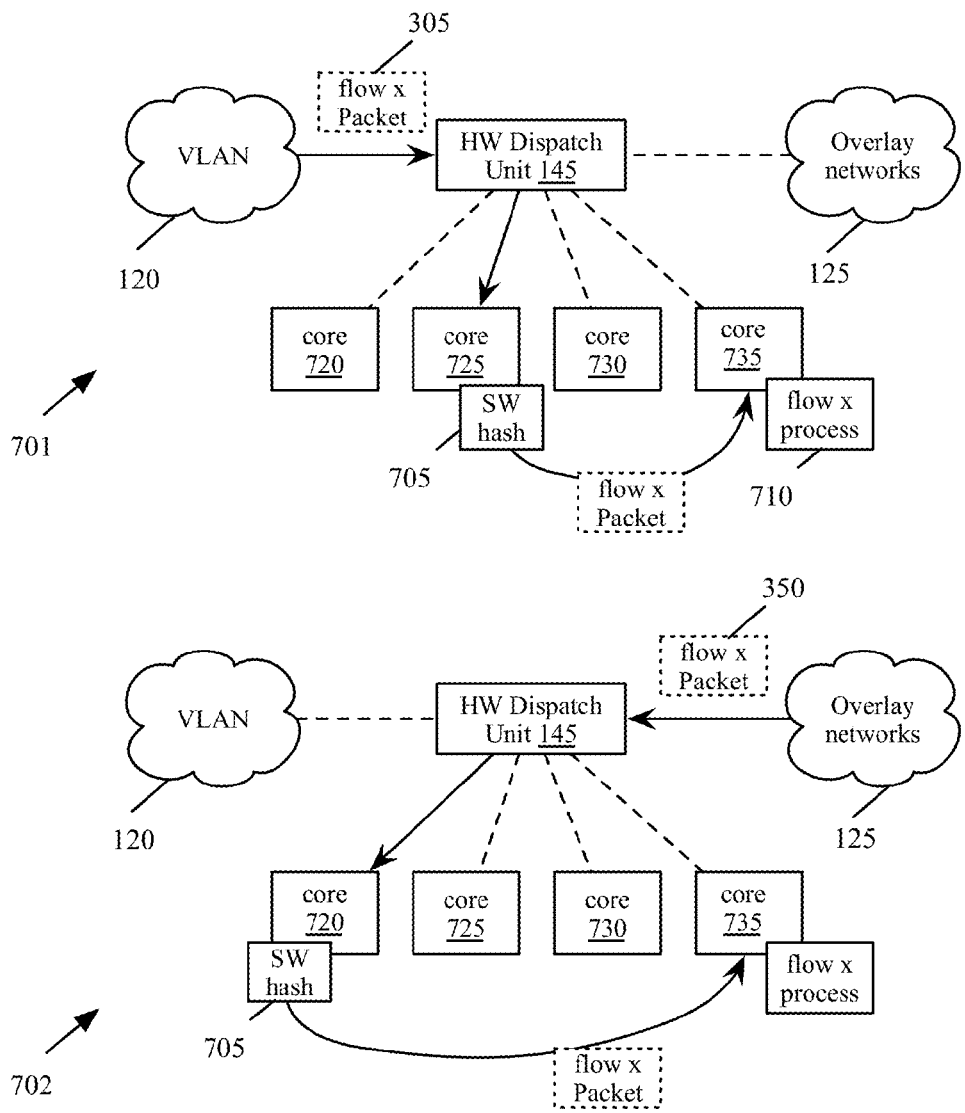
FIG. 7 conceptually illustrates re-dispatching of the packets received from all networks by using a software implemented hash algorithm in some embodiments.

FIG. 7 conceptually illustrates re-dispatching of the packets received from all networks by using a software implemented hash algorithm in some embodiments. The figure is shown in two steps 701 and 702. In step 701, a packet for flow x is received from network 120 at the hardware dispatch unit 145. The hardware dispatch unit performs a hash algorithm (as described above by reference to FIGS. 3 and 4) on an n-tuple of the packet (e.g., n-tuple 315 shown in FIGS. 3 and 4) and dispatches the packet to core 725 based on the hash value.

In the embodiment of FIG. 7, however, core 725 always performs a software implemented hash (as shown by 705) on each packet that is received at the core's receiving queue, whether or not the packet is overlay encapsulated. The software hash is performed on an m-tuple of the packet. This m-tuple may or may not be the same as n-tuple 305 that is used by the hardware dispatch unit. The m-tuple, however, is selected such that it uniquely identifies the flow (e.g., flow x) to which the packet belongs. As described above, different sets of header fields in packet can be used to uniquely identify the packet's flow.

In addition, the software hash algorithm does not have to be the same algorithm as used by the hardware dispatch unit. Some embodiments select a hash algorithm to perform by core software based on criteria such as the possibility of collision (i.e., two distinct tuples hash to the same value), the computation time for performing the hash on a tuple, the storage required to perform the hashing, the ease of performing different operations by software, etc.

Since the hash algorithm used by the core software is independent of the hash algorithm used by the hardware dispatch unit, there is no need to change the software hash algorithm if the hash algorithm used by the hardware dispatch unit is changed. In fact, there is no need for the core software to know what hashing algorithm is used by the hardware since all packets are re-hashed by the core software. As shown in step 701, the packet is re-dispatched to core 735, which processes the packet (as shown by 710).

In step 702, a packet 350 is received at the hardware dispatch unit 145 from a logical network such as overlay network 125. Similar to step 302 in FIG. 3 and step 402 in FIG. 4, the hardware dispatch unit applies a hash algorithm on an n-tuple of the packet (e.g., n-tuple 355) and dispatches the packet to core 720.

As shown, core 720 applies a software implemented hash using the same hash algorithm (as shown by 705) used by software in step 701 on the same tuple used by software in step 701 to calculate a hash value and identify a core to re-dispatch the packet. Since the algorithms and tuples used in steps 701 and 702 are identical, the same core (i.e., core 735 in this example) is identified in step 702 as the core to re-dispatch the packet. Core 720, therefore, re-dispatches the packet to core 735. Core 735 processes packet 350 as shown by 710.

Figure 8:
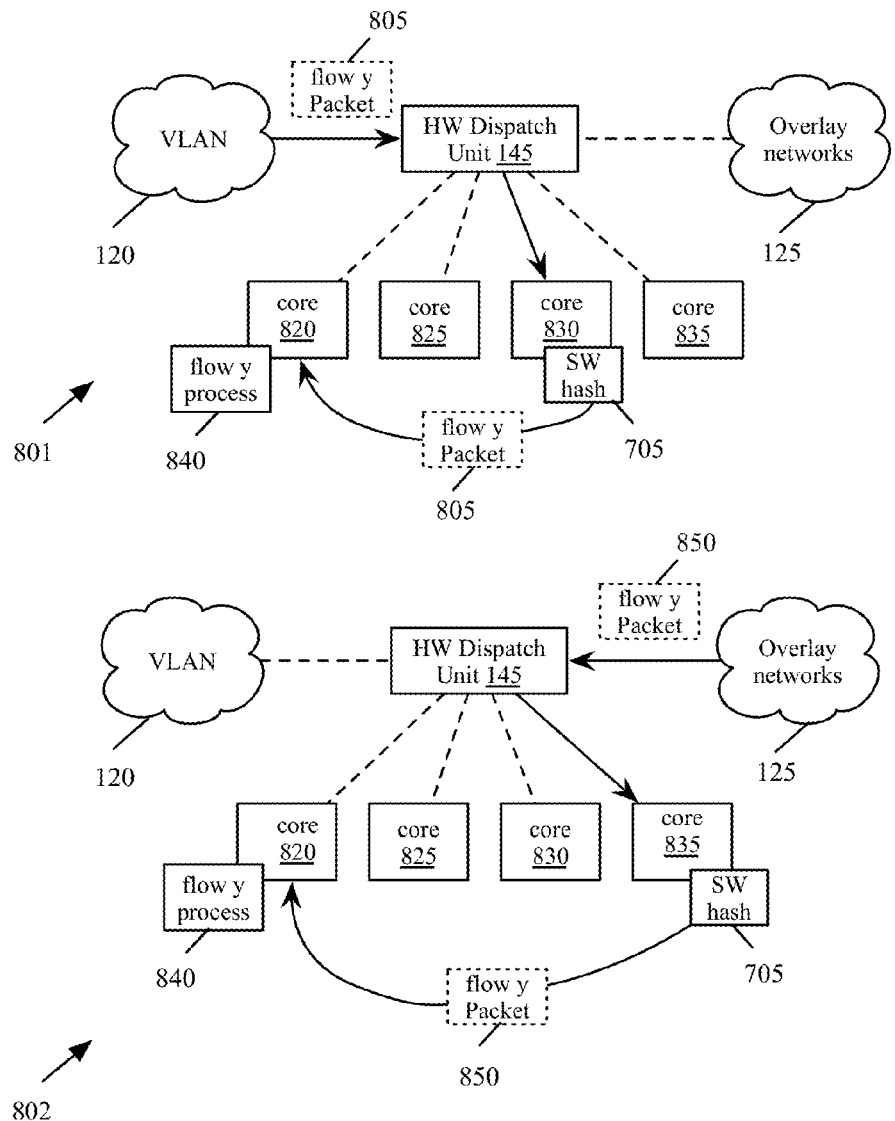
FIG. 8 conceptually illustrates the system of FIG. 7 re-dispatching the packets of another flow received from different networks by using a software implemented hash algorithm.

FIG. 8 conceptually illustrates the system of FIG. 7 re-dispatching the packets of another flow received from different networks by using a software implemented hash algorithm. The figure is shown in two steps 801 and 802. In step 801, a packet 805 for flow y (which is different than flow x in FIG. 7) is received from network 120 at the hardware dispatch unit 145.

The hardware dispatch unit performs a hash algorithm (as described above by reference to FIGS. 3, 4, and 7) on an n-tuple of the packet. Since the n-tuple of flow y has a different value than the n-tuple of flow x, the calculated hash value is different than the hash value calculated in step 701 in FIG. 7. As shown, the flow y packet 805 is dispatched by the hardware dispatch unit to core 830.

Core 830 performs a software implemented hash (as shown by 705) on each packet that is received at the core's receiving queue. The software hash is performed on an m-tuple of the packet. As shown in step 801, the flow y packet 805 is re-dispatched to core 820, which processes the packet 805 (as shown by 840).

In step 802, another packet 850 for flow y is received at the hardware dispatch unit 145 from a logical network such as overlay network 125. The hardware dispatch unit applies a hash algorithm on an n-tuple of the packet (e.g., n-tuple 355 in FIG. 4) and dispatches the packet to core 835.

As shown, core 835 applies a software implemented hash using the same hash algorithm (as shown by 705) used in step 801 on the same m-tuple used by software in step 801 to calculate a hash value and identify a core to re-dispatch the packet. Since the algorithms and tuples used in steps 801 and 802 are identical, core 820 is identified in step 802 as the core to re-dispatch the packet for flow y. Core 835, therefore, re-dispatches the packet to core 820. Core 820 processes packet 850 as shown by 840.

Figure 9:
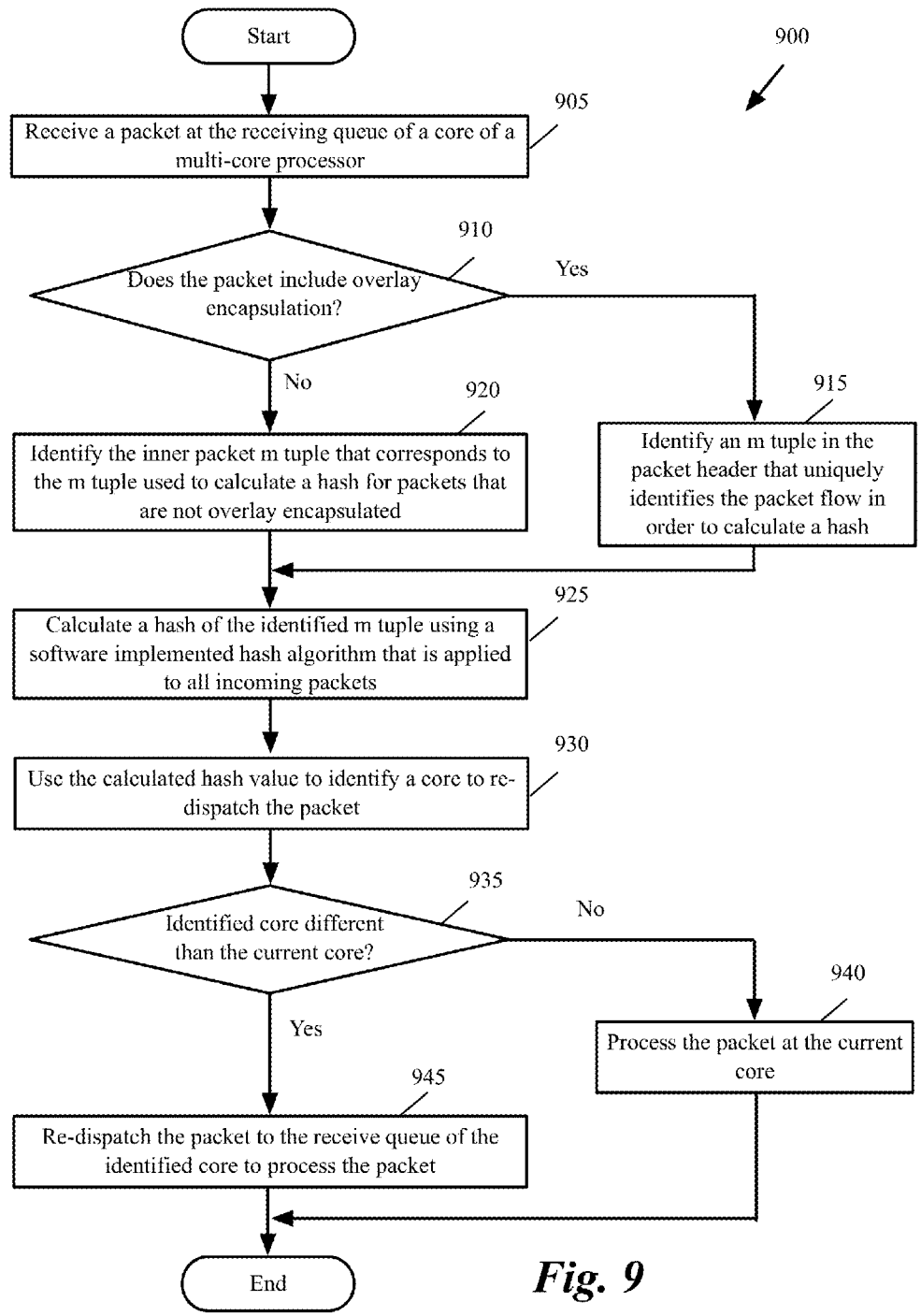
FIG. 9 conceptually illustrates a process in some embodiments for performing re-dispatching of the packets that are received from different networks.

FIG. 9 conceptually illustrates a process 900 in some embodiments for performing re-dispatching of the packets that are received from different networks. Process 900 is performed by a processing unit (or a core) of a multi-core processor in some embodiments. As shown, the process receives (at 905) a packet at the receiving queue of a core of a multi-core processor. For instance, the process receives packet 305, or 350 at core 725 or 720 as shown in FIG. 7.

The process then determines (at 910) whether the packet includes overlay encapsulation. For instance, the process may examine one or more header fields that indicate the packet is overlay encapsulated, as described above by reference to operation 510 in FIG. 5. If yes, the process identifies (at 915) an m-tuple in the packet header to calculate a hash value. The m-tuple in some embodiments is a set of m fields that uniquely identifies each flow. Different embodiments include different sets of fields in this m-tuple. However, each embodiment always uses the same m-tuple for all received packets to perform hashing. For instance, the m-tuple may include the L3 source and destination addresses (e.g., IP source and IP destination addresses), the L4 source and destination ports (e.g., TCP or UDP source and destination ports), and the L4 protocol used (e.g., TCP or UDP). The process then proceeds to 925, which is described below.

When the process determines that the packet includes overlay encapsulation, the process identifies (at 920) the inner packet m-tuple that corresponds to the m-tuple that is used to calculate a hash value for packets that are not overlay encapsulated (i.e., the m-tuple described above by reference to operation 915). In other words, the process bypasses the overlay encapsulation layers to access the inner packet (such as inner packet 280 in FIG. 2B or inner packet 360 in FIG. 4) and applies the same criteria (e.g., the same offsets or the same fields) to the inner packet fields that are used to apply to packets that do not include overlay encapsulation.

Next, the process calculates (at 925) a hash of the identified m-tuple using a software implemented hash algorithm. The process then uses the hash value to identify (at 930) a core (such as core 735 in FIG. 7) to re-dispatch the packet. For instance, the process masks out the low order bits of the hash value and uses a set of higher bits of the hash value to select one of the cores, as described above. Alternatively, the process calculates a modulo of the hash value based on the number of the available cores to identify a core to dispatch the packet.

The process then determines (at 935) whether the identified core is different than the current core. Although the process uses a different algorithm (and possibly a different m-tuple) to calculate the hash value than the algorithm and n-tuple used by hardware dispatch unit, there is always a chance that the calculating the hash values and taking a set of bits from the hash value by the hardware dispatch unit and the core software result in identifying the same core.

When the core identified in operation 930 is the same as the current core, the process performs (at 940) packet processing at the current core (i.e., the core that has received the packet in its receiving queue). Examples of processing performed by process 900 on a packet includes performing connection tracking, providing firewall services, performing NAT, checking security protocols, etc., for the packet. The process then either forwards the packet to the next destination identified in the packet headers or drops the packet based on different criteria used to forward a packet to its next destination. The process then ends.

When the core identified in operation 930 is not the same as the current core, the process re-dispatches (at 945) the packet to the receive queue of the core identified by software hashing in order for the identified core to process the packet. For instance, the packet is re-dispatched from core 720 to core 735 as shown in FIG. 7. The process then ends.

In some embodiments, a core that re-dispatches a packet to another core strips the overlay encapsulation layers of the packet prior to re-dispatching the packet to the other core in order to prevent the other core from repeating process 900 on the packet. In other embodiments, a core that re-dispatches a packet to another core sends a signal (e.g., by setting or resetting a flag or semaphore in a pre-determined location in L2 cache that is accessible by all cores) to signal the other core not to repeat process 900 on the packet.

Since all packets of the same flow are processed by the same core, there is no need to lock the common data structures that are used to process different packets of the same flow. The re-dispatching method described by reference to FIGS. 7-9 requires an additional re-dispatch even for packets that do not include overlay encapsulation. The advantage of this method is that the hash algorithm used for software re-dispatch need not be the same as the hash algorithm used by the hardware dispatch unit. The method also does not require hashing the same n-tuple as the n-tuple hashed by the hardware dispatch unit.

III. Dispatching Packets Using Hardware that is Aware of Overlay Networks

Some embodiments provide a hardware dispatch unit that dispatches packets with the knowledge of the structure of overlay encapsulated packets. These embodiments do not require a software re-dispatch of some or all of the received packets as required by the methods described in Sections I and II, above.

Figure 10:
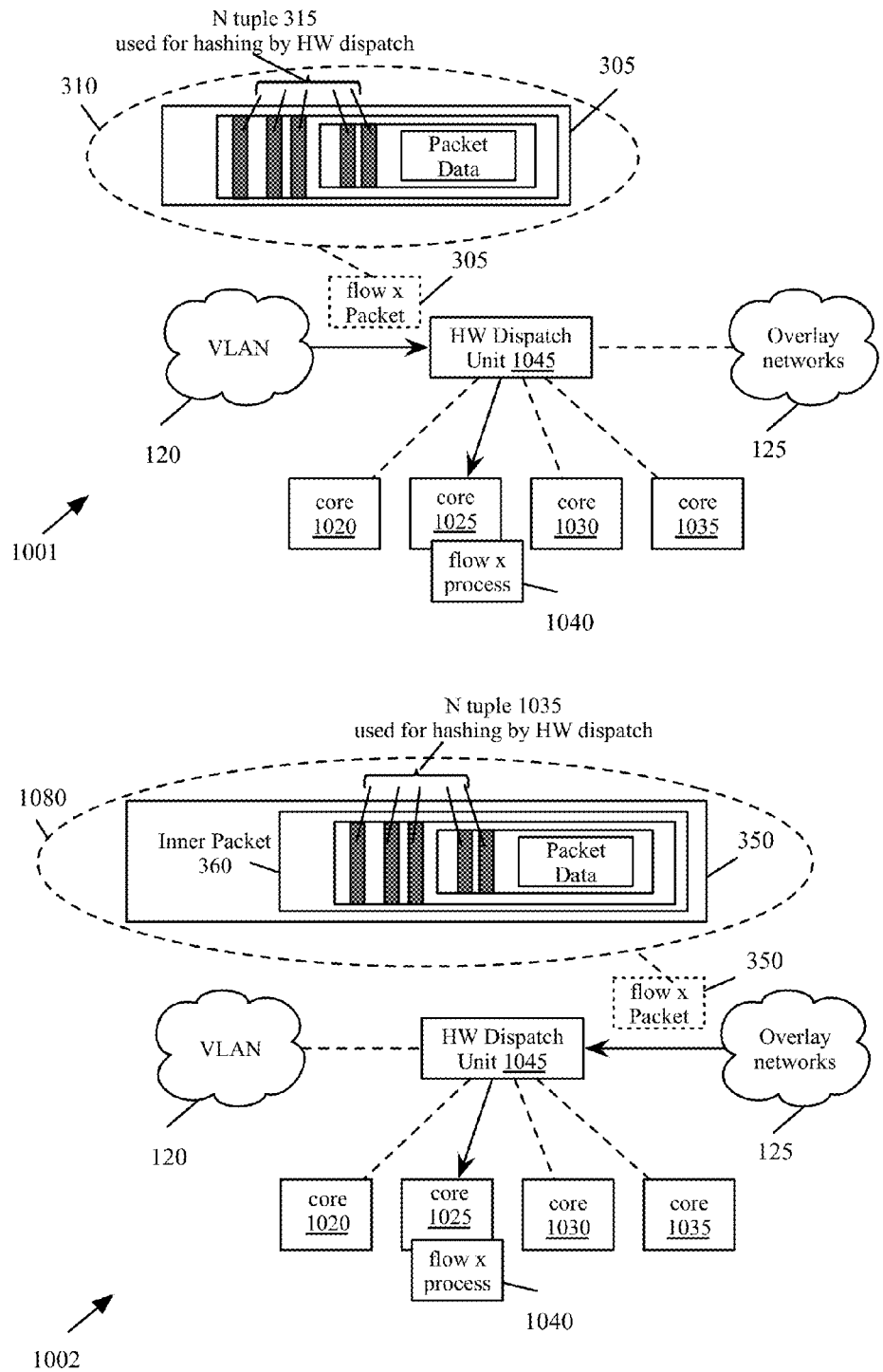
FIG. 10 conceptually illustrates dispatching of the packets received from all networks by the hardware dispatch unit such that packets of the same flow are dispatched to the same core regardless of whether or not the packets are overlay encapsulated in some embodiments.

FIG. 10 conceptually illustrates dispatching of the packets received from all networks by the hardware dispatch unit in some embodiments such that packets of the same flow are dispatched to the same core regardless of whether or not the packets are overlay encapsulated. The figure is shown in two steps 1001 and 1002.

Step 1001 is similar to step 301 in FIG. 3 and step 401 in FIG. 4. As shown, a packet 305 for flow x is received from a network 120 (in this example a VLAN) that does not use overlay encapsulation. The hardware dispatch unit 1045 uses an n-tuple 315 in the packet's header to calculate a hash value. For instance, the n-tuple may include the L3 source and destination addresses (e.g., IP source and IP destination addresses), the L4 source and destination ports (e.g., TCP or UDP source and destination ports), and the L4 protocol used (e.g., TCP or UDP). The hash value is used to select a core 1025. The packet is dispatched to and processed by core 1025.

In step 1002, a packet 350 is received from an overlay network such as overlay network 125. As shown in the expanded view 1080, the inner packet 360 is encapsulated by overlay network's outer layer headers (as described by reference to FIG. 2B). Unlike step 402 in FIG. 4, or step 702 in FIG. 7, the hardware dispatch unit is aware of overlay network packet structure. As shown in the expanded view 1080, the hardware dispatch unit selects the inner packet n-tuple 1035 that matches n-tuple 315 selected in step 1001.

The hardware dispatch unit in some embodiments examines (e.g., by using the hardware of firmware in the hardware dispatch unit) one or more header fields that indicate the packet is overlay encapsulated. As described above, a packet that includes VXLAN overlay encapsulation may specify a particular UDP port as the destination port in the outer L4 header. The particular UDP port in the outer L4 destination port, therefore, may specify that the packet includes overlay encapsulation as well as the type of overlay encapsulation (e.g., VXLAN) used. Alternatively, the hardware dispatch unit may determine the packet is overlay encapsulated when the packet is received from a particular overlay network. For instance, the hardware dispatch unit may determine that the packet is received from a logical network that uses a specific type of overlay encapsulation (e.g., VXLAN encapsulation).

The hardware dispatch unit 1045 then calculates a hash value for the n-tuple 1035. The calculated hash value would be the same as the hash value calculated in step 1001 for n-tuple 315 (since n-tuples 315 and 1035 belong to the same flow and have identical values). The hash value is then used to dispatch packet 350 to core 1025, which is the same core that processes packets of the same flow that were not overlay encapsulated.

Figure 11:
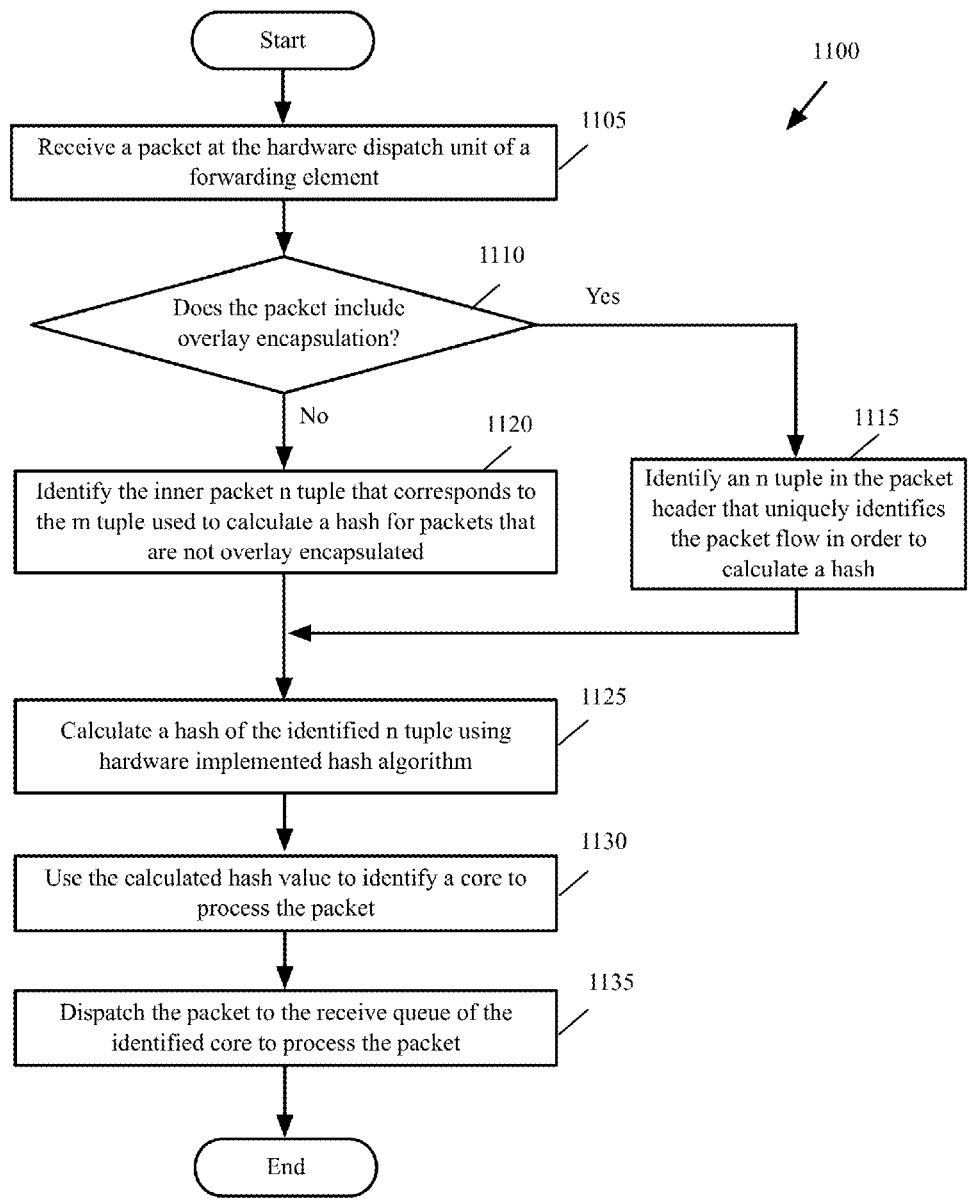
FIG. 11 conceptually illustrates a process for performing dispatching of the packets by a hardware dispatch unit in some embodiments such that the packets of the same flow are dispatched to the same core regardless of whether or not the packets include overlay encapsulation.

FIG. 11 conceptually illustrates a process 1100 for performing dispatching of the packets by a hardware dispatch unit in some embodiments such that the packets of the same flow are dispatched to the same core regardless of whether or not the packets include overlay encapsulation. Process 1100 is performed by a hardware dispatch unit (e.g., by hardware components and/or firmware in the hardware dispatch unit) in some embodiments. As shown, the process receives (at 1105) a packet at the hardware dispatch unit of a forwarding element. For instance, the process receives packet 305 or 350 at hardware dispatch unit 1045 as shown in FIG. 10.

The process then determines (at 1110) whether the packet includes overlay encapsulation. For instance, the process may examine one or more header fields that indicate the packet is overlay encapsulated as described above by reference FIG. 10. If yes, the process identifies (at 1115) an n-tuple in the packet header to calculate a hash value. The n-tuple in some embodiments is a set of n fields that uniquely identifies each flow. Different embodiments include different sets of fields in this n-tuple. However, each embodiment always uses the same n-tuple for all received packets to perform hashing. For instance, the n-tuple may include the L3 source and destination addresses (e.g., IP source and IP destination addresses), the L4 source and destination ports (e.g., TCP or UDP source and destination ports), and the L4 protocol used (e.g., TCP or UDP). The process then proceeds to 1125, which is described below.

When the process determines that the packet includes overlay encapsulation, the process identifies (at 1120) the inner packet n-tuple that corresponds to the n-tuple that is used to calculate a hash value for packets that are not overlay encapsulated (i.e., the n-tuple described above by reference to operation 1115). In other words, the process bypasses the overlay encapsulation layers to access the inner packet and applies the same criteria (e.g., the same offsets or the same fields) to the inner packet fields that are used to apply to packets that do not include overlay encapsulation. For instance, the process identifies n-tuple 1035 in the inner packet 360 that corresponds to n-tuple 315 of packet 305 in FIG. 10.

Next, the process calculates (at 1125) a hash of the identified n-tuple using a hardware implemented hash algorithm. The process then uses the hash value to identify (at 1130) a core (such as core 1025 in FIG. 10) to process the packet. For instance, the process masks out the low order bits of the hash value and uses a set of higher bits of the hash value to select one of the cores, as described above. Alternatively, the process calculates a modulo of the hash value based on the number of the available cores to identify a core to dispatch the packet.

The process dispatches (at 1135) the packet to the receive queue of the core identified by hash value in order for the identified core to process the packet. The process then ends.

Since all packets of a flow are dispatched by hardware to the same core, there is no need for re-dispatching by software. Since all packets of the same flow are processed by the same core, there is also no need to lock common data structures that are used to process different packets of the same flow.

Figure 12A:
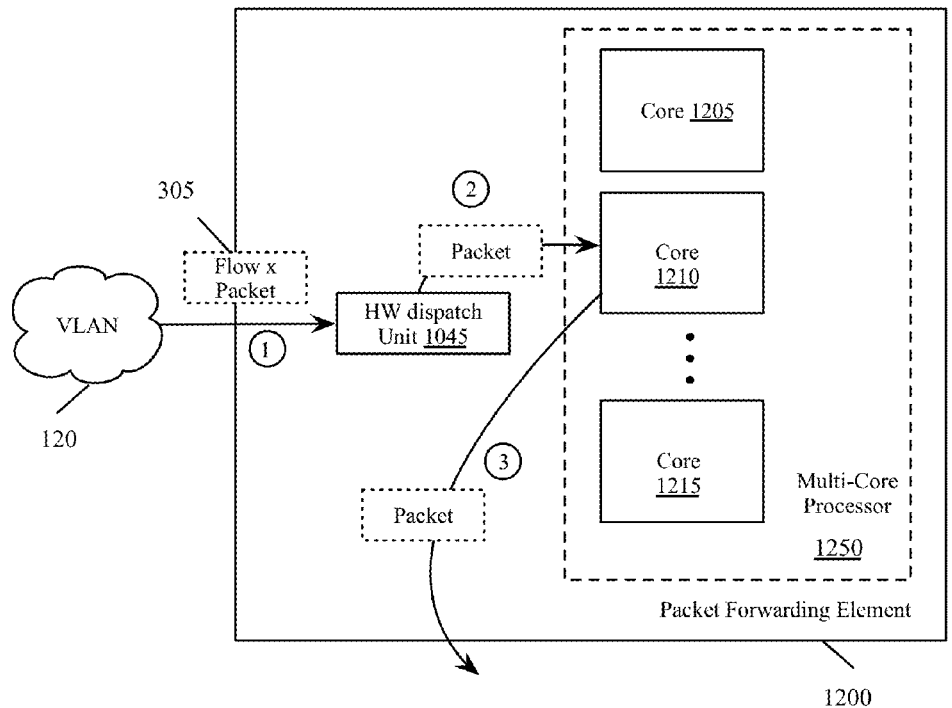
FIGS. 12A and 12B conceptually illustrate the path of packets received from different networks inside a forwarding element in some embodiments.
Figure 12B:
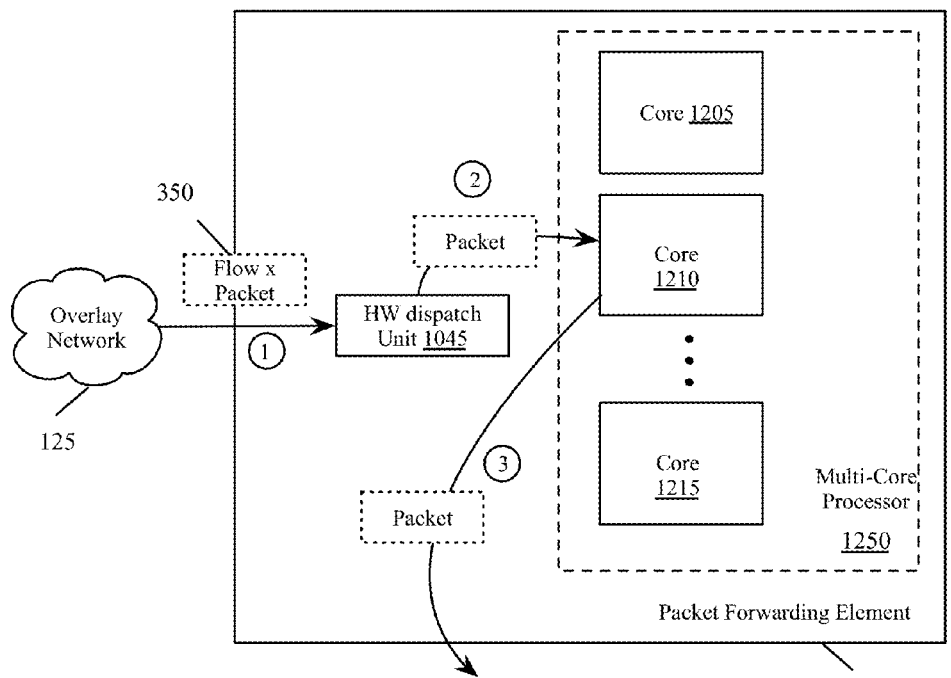

FIGS. 12A and 12B conceptually illustrate the path of packets received from different networks inside a forwarding element 1200 in some embodiments. The packet forwarding element 1200 includes a hardware dispatch unit 1045 and a multi-core processor 1250 that includes several cores 1205-1215. The hardware dispatch unit comprises logic, electronic circuitry, interfaces and/or code that are operable to receive packets from networks and dispatch the packets to the cores of the multi-core processor. For instance, the hardware dispatch unit in some embodiments includes hardware components and/or firmware that implement process 1100 of FIG. 11. The firmware is stored, for instance, in a non-transitory machine-readable storage of the hardware dispatch unit. The hardware dispatch unit also includes an interface (e.g., a NIC interface) to receive packets from different networks.

As shown in step 1 of FIG. 12A, a packet 305 for flow x is received by the hardware dispatch unit 1045 from a physical network such VLAN 120. The hardware dispatch unit then calculates the hash of an n-tuple in the packet and dispatches the packet (as shown in step 2) to a core 1210 that is identified based on the calculated hash value. In step 3, the software in core 1210 processes the packet and forwards the packet to the next destination outside the forwarding element 1200 as shown in step 3.

FIG. 12B shows that a packet for flow x that is received from an overlay network 125 travels the same path through the forwarding element 1200 as the packet received from VLAN 120. As shown in step 1 of FIG. 12B, packet 350 is received by the hardware dispatch unit 1045 from a logical network such overlay network 125.

Packet 350 includes overlay encapsulation. However, the hardware dispatch unit is aware of the structure of the overlay encapsulated packet and selects the same n-tuple to hash as in FIG. 12A. For instance, the hardware dispatch unit selects the inner packet n-tuple 1035 that matches n-tuple 315 as shown in FIG. 10.

The hardware dispatch unit then calculates the hash of the identified n-tuple in the packet and dispatches the packet (as shown in step 2 of FIG. 12B) to a core 1210 that is identified based on the calculated hash value. The calculated hash value would be the same as the hash value calculated in step 2 of FIG. 12A because the n-tuples identified by step 2 of FIG. 12A and step 2 of FIG. 12B are identical (both n-tuples include the same fields, belong to the same flow, and have identical values).

The hash value is then used to dispatch packet 350 to core 1025, which is the same core that processes packets of the same flow that were not overlay encapsulated. This is the same core that received the packet for the same flow (in this example flow x) in FIG. 12A. In step 3, the software in core 1210 processes the packet and forwards the packet to the next destination outside the forwarding element 1200 as shown in step 3.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1320, a read-only memory (ROM) 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1320, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1320 is a read-and-write memory device. However, unlike storage device 1335, the system memory is a volatile read-and-write memory, such as random access memory. The system memory stores some of the instructions and data that the processor needs at runtime. In some embodiments, the invention's processes are stored in the system memory 1320, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 5, 9 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A packet forwarding element comprising:
    a multi-core processor comprising a plurality of processing cores; and
    a hardware dispatch unit configured to:
        receive packets from a physical network and a plurality of logical networks, the physical network different than the logical networks, each packet comprising a first header with a plurality of header fields, wherein packets received from the logical networks are encapsulated with an overlay network header, and wherein packets received from the physical network are not encapsulated with an overlay network header;
        select, for each packet that is not encapsulated with an overlay network header, a set of header fields from the packet's first header to identify a packet flow from the packet header;
        select, for each packet that is encapsulated with an overlay network header, a set of header fields from the packet's first header to identify the packet flow; and
        dispatch each packet to a core of the multi-core processor based on a hash value calculated from the set of header fields selected for the packet.

2. The packet forwarding element of claim 1, each core comprising a non-transitory machine readable medium storing a program executable by the core, the program comprising a set of instructions for processing a packet received at the core from the hardware dispatch unit.

3. The packet forwarding element of claim 2, wherein the cores of the multi-core processor use a set of data structures for processing packets of each flow, wherein the hardware dispatch unit dispatches packets of each flow to a particular core in order for the particular core to avoid placing a lock on the data structures used for the packets of the flow.

4. The packet forwarding element of claim 2, wherein the set of instructions for processing a packet comprises a set of instructions for determining whether to forward the packet to a next destination outside the packet forwarding element.

5. The packet forwarding element of claim 2, wherein the set of instructions for processing a packet comprises a set of instructions for dropping the packet based on a set of criteria for processing the packet.

6. The packet forwarding element of claim 2, wherein the set of instructions for processing a packet comprises at least one of a set of instructions for applying a set of firewall rules to the packet, a set of instructions for performing network address translation (NAT), and a set of instructions for checking security protocols.

7. The packet forwarding element of claim 1, wherein the hardware dispatch unit is configured to utilize toeplitz hashing algorithm to calculate the hash value of the set of the header fields of each packet.

8. The packet forwarding element of claim 1, wherein the hardware dispatch unit is configured to dispatch the packet utilizing receive side scaling (RSS).

9. The packet forwarding element of claim 1, wherein each particular core comprises an L1 cache accessible to the particular core.

10. The packet forwarding element of claim 1, wherein the multi-core processor further comprises L2 cache accessible to the plurality of cores of the multi-core processor.

11. The packet forwarding element of claim 1, wherein the packet forwarding element is a gateway at an edge of a network.

12. The packet forwarding element of claim 1, wherein the hardware dispatch unit interfaces with a network interface card (NIC) to receive incoming packets.

13. The packet forwarding element of claim 1, wherein each core comprises a receiving queue to receive packets from the hardware processing unit, wherein the hardware dispatch unit dispatches a packet to a core by placing the packet in the receiving queue of the core.

14. A hardware dispatch unit of a packet forwarding element, comprising:
an interface to receive packets from a physical network and a plurality of logical networks, the physical network different than the logical networks, each packet comprising a first header with a plurality of header fields, wherein packets received from the logical network are encapsulated with an overlay network header, and wherein packets received from the physical networks are not encapsulated with an overlay network header,
the hardware dispatch unit configured to:
select, for each packet that is not encapsulated with an overlay network header, a set of header fields from the packet's first header to identify a packet flow from the packet header;
select, for each packet that is encapsulated with an overlay network header, a set of header fields from the packet's first header to identify the packet flow; and
dispatch each packet to a core of a multi-core processor of the packet forwarding element based on a hash value calculated from the set of the header fields of the packet.

15. The hardware dispatch unit of claim 14 further comprising electronic circuitry configured to perform said selecting the set of header fields for each packet that is not encapsulated, said selecting the set of header fields for each packet that is encapsulated, and said dispatching each packet to a core of the multi-core processor.

16. The hardware dispatch unit of claim 14 further comprising firmware configured to perform said, selecting the set of header fields for each packet that is not encapsulated, said selecting the set of header fields for each packet that is encapsulated, and said dispatching each packet to a core of the multi-core processor.

17. The hardware dispatch unit of claim 14, wherein the hardware dispatch unit dispatches the packet to a core by placing the packet in a packet receiving queue of the core.

18. The hardware dispatch unit of claim 14, wherein the hardware dispatch unit is configured to utilize toeplitz hashing algorithm to calculate the hash value of the set of header fields of each packet.

19. The hardware dispatch unit of claim 14, wherein the hardware dispatch unit is configured to dispatch the packet utilizing receive side scaling (RSS).

20. The hardware dispatch unit of claim 14, wherein the packet forwarding element is a gateway at an edge of a network.

* * * * *